United States Patent
Ruegsegger et al.

(10) Patent No.: US 6,404,322 B1
(45) Date of Patent: *Jun. 11, 2002

(54) FUSIBLE LINK

(75) Inventors: Brian D. Ruegsegger; Robert Simon, both of Auburn, IN (US)

(73) Assignee: Elsie Manufacturing Company, Inc., Waterloo, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,559

(22) Filed: Feb. 12, 1999

(51) Int. Cl.[7] ................. H01H 37/76; H01H 85/055; F16B 5/08
(52) U.S. Cl. .................. 337/416; 337/159; 337/232; 337/295; 403/271
(58) Field of Search ................. 337/159, 152, 337/148, 160, 232, 416, 290, 295, 296; 403/179, 270, 271

(56) References Cited

U.S. PATENT DOCUMENTS

| | | | | |
|---|---|---|---|---|
| 1,084,710 A | * | 1/1914 | Rockwood | 169/42 |
| 1,092,562 A | * | 4/1914 | Cotton | 169/42 |
| 1,613,453 A | * | 1/1927 | Grimshaw | 169/42 |
| 2,198,410 A | * | 4/1940 | Lafleur | 337/407 |
| 2,796,494 A | * | 6/1957 | Barnes | 337/416 |
| 3,348,617 A | * | 10/1967 | Macartney | 169/42 |
| 3,779,004 A | * | 12/1973 | Gloeckler | 59/93 |
| 4,055,829 A | * | 10/1977 | Ruegsegger | 337/416 |
| 4,405,914 A | * | 9/1983 | Ruegsegger | 337/152 |
| 5,120,152 A | * | 6/1992 | Gueli | 403/179 |
| 5,686,878 A | * | 11/1997 | Gueli | 337/416 |

* cited by examiner

Primary Examiner—Gerald Tolin
Assistant Examiner—Anatoly Vortman
(74) Attorney, Agent, or Firm—Krieg DeVault Lundy LLP

(57) ABSTRACT

A new and improved fusible link having opposite ends. The fusible link comprises two pieces each having opposite ends. One of the opposite ends of each piece defines the opposite ends of the link. The other end of said pieces overlap each other and have a eutectic solder therebetween. Means is provided adjacent the other end of the pieces to strengthen the link in tension between the opposite ends when said solder is in shear and to reduce creep. Means is also provided adjacent the other ends of the pieces to separate the pieces and break the linkage upon the eutectic solder reaching the eutectic temperature. The new and improved fusible link in a specific embodiment utilizes a crimp and crimp sliding surfaces to prevent creep at temperatures lower than the eutectic temperature for providing separation of the link upon the solder being heated to a eutectic temperature.

19 Claims, 2 Drawing Sheets

FUSIBLE LINK

BACKGROUND OF THE INVENTION

This invention relates to fusible elements, and more particularly to a fusible link.

Fusible elements have long been known. These elements are temperature responsive. At a predetermined temperature, the elements separate to enable the actuation of an alarm or other device or to render equipment inoperable or operable.

Generally, fusible elements work on the principle that multiple pieces are held together by a eutectic solder which liquefies at the eutectic temperature of the solder to enable the elements to separate when the eutectic temperature is reached. Generally, the use of fusible elements is fraught with difficulty because of the general weakness or the weakness of the solder weld and the general physical properties of the solder itself.

Some fusible elements are unsatisfactory because they tend to "creep", i.e., tend to allow slippage to occur between the fusible parts at temperatures lower than the eutectic temperature or loads higher than solder itself will hold, rather than a clean separation when the eutectic temperature is reached. This slippage may cause a malfunctioning of the fuse. Creep is especially experienced when the fusible element is under tension under use. It is therefore highly desirable to provide a new and improved fusible element. It is also highly desirable to provide a new and improved fusible link which may bear a load with a smaller surface area than now required beneath the eutectic temperature without creep.

Other fusible elements fail because it has been found that the solder is unable to completely fill the space between the confronting or superimposed surfaces of the fuse, thereby developing voids and a weakness of the fuse. Therefore, it is also highly desirable to provide a new and more reliable fusible link without solder voids between the superimposed faces of the fuse.

Because of the weakness of eutectic solders, fusible elements usually are designed to subject the solder only to shear stresses. Whenever stresses, which are transverse to a shear stress are applied, the solder may tear or otherwise fail, again resulting in a malfunctioning of the fuse. Therefore, it is also highly desirable to provide a new and improved fusible link in which the stresses applied to the eutectic solder of the fusible element are all in shear.

Additionally, it is highly desirable that when the predetermined eutectic temperature or a eutectic temperature within an acceptable temperature range is reached, the fusible element separates cleanly. It is therefore highly desirable to provide a new and improved fusible link which breaks cleanly at the eutectic temperature and can bear a greater ambient temperature without failure.

Prior use of eutectic solders has always been accompanied with fire hazards and chemical waste hazards. Applying eutectic solders usually requires the solder to be applied in a melted form requiring the open flame of a torch. Additionally, solder fluxes are used which vaporize into hazardous gases and solidify into droppings which include hazardous chemical waste.

It is also highly desirable to provide a new and improved fusible link which utilizes the physical properties of the eutectic solder most desirably.

Finally, it is highly desirable to provide a new and improved fusible link which has all of the above desired features.

SUMMARY OF THE INVENTION

It is therefore an object of the invention to provide a new and improved fusible element.

It is therefore an object of the invention to provide a new and improved fusible link which may bear a load with a smaller surface area than now required beneath the eutectic temperature without creep.

It is therefore an object of the invention to provide a new and more reliable fusible link without solder voids between the superimposed faces of the fuse.

It is therefore an object of the invention to provide a new and improved fusible link in which the stresses applied to the eutectic solder of the fusible element are all in shear.

It is therefore an object of the invention to provide a new and improved fusible link which breaks cleanly at the eutectic temperature and can bear a greater ambient temperature without failure.

It is therefore an object of the invention to provide a new and improved fusible link which utilizes the physical properties of the eutectic solder most desirably.

Finally, it is therefore an object of the invention to provide a new and improved fusible link which has all of the above desired features.

In the broader aspects of the invention there is provided a new and improved fusible link having opposite ends. The fusible link comprises two pieces each having opposite ends. One of the opposite ends of each piece defines the opposite ends of the link. The other end of said pieces overlap each other and have a eutectic solder therebetween. Means is provided adjacent the other end of the pieces to strengthen the link in tension between the opposite ends when said solder is in shear and to reduce creep. Means is also provided adjacent the other ends of the pieces to separate the pieces and break the linkage upon the eutectic solder reaching the eutectic temperature. The new and improved fusible link in a specific embodiment utilizes a crimp and crimp sliding surfaces to prevent creep at temperatures lower than the eutectic temperature for providing separation of the link upon the solder being heated to a eutectic temperature.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
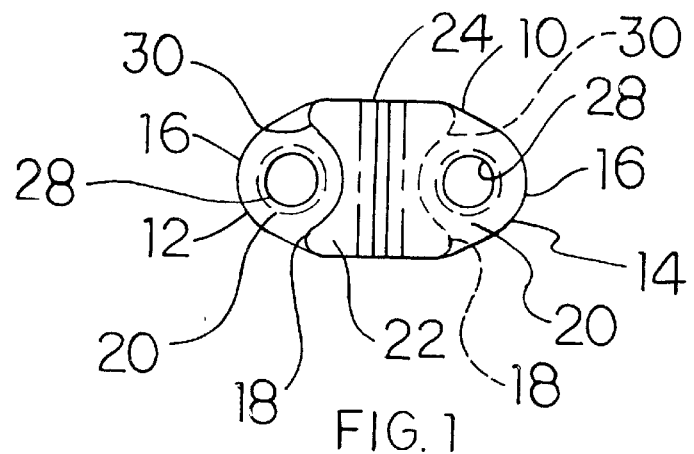
FIG. 1 is a top planar view of the new and improved fusible link of the invention.

The new and improved fusible link 10 is shown in FIGS. 1–3, and 7 to include a first piece 12, and a second piece 14, each having opposite ends 16, 18.

Both pieces 12, 14 are formed of sheet metal having generally a uniform thickness. Both pieces 12, 14 have planar portions 20, 22 adjacent their opposite ends 16, 18 and a bent portion or crimp 24 therebetween. Adjacent end 16 is a planar portion 20 in which there is positioned an opening 28 for connecting the link to associated structure by a bolt, pin, rivet, hook or the like. Adjacent end 18 is a planar portion 22 in which there is a cut-out 30 formed. The purpose for cut-out 30 will be mentioned hereinafter.

End 16 is radiused as well as cut-out 30 and each of the corners are radiused. End 16 has a radius which is appreciably larger than the other radiuses. Cut-out 30 has a radius larger than the diameter of opening 28 to protect against entanglement during separation and less than the radius of end 16. Each of the corners are radiused with radiuses as desired. In a specific embodiment, the radius of end 16 is 0.875 inch. The radius of opening 28 is 0.108 inch. The radius of cut-out 30 is 0.283 inch and the corner radiuses are 0.062 inch.

Figure 2:
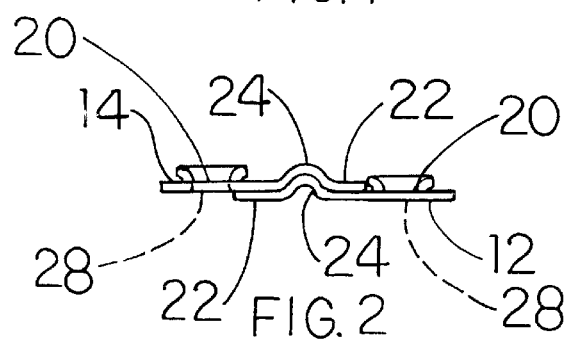
FIG. 2 is a side view thereof.
Figure 3:
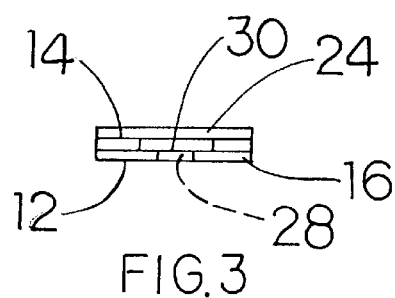
FIG. 3 is an end view thereof.
Figure 4:
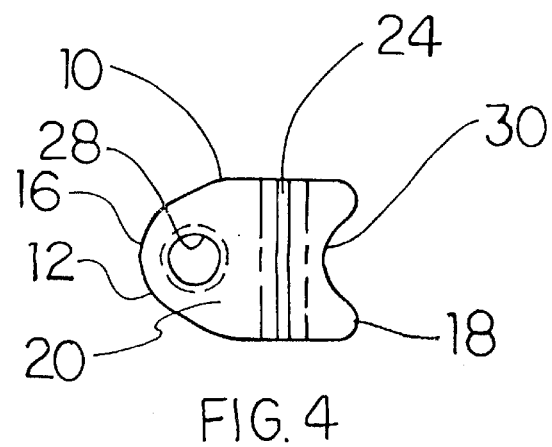
FIG. 4 is a top planar view of one of the pieces thereof.
Figure 5:
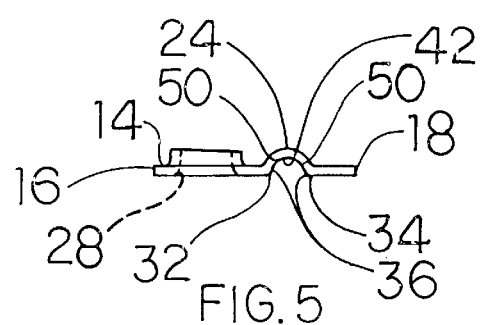
FIG. 5 is a side view thereof.
Figure 6:
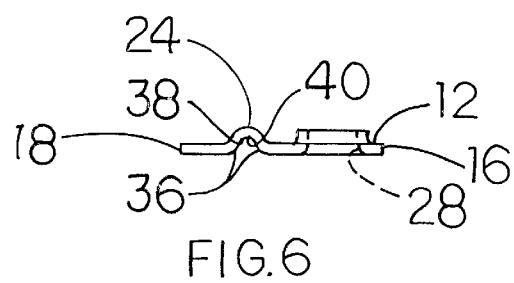
FIG. 6 is a side view of the second piece of the new and improved fusible link of the invention.
Figure 7:
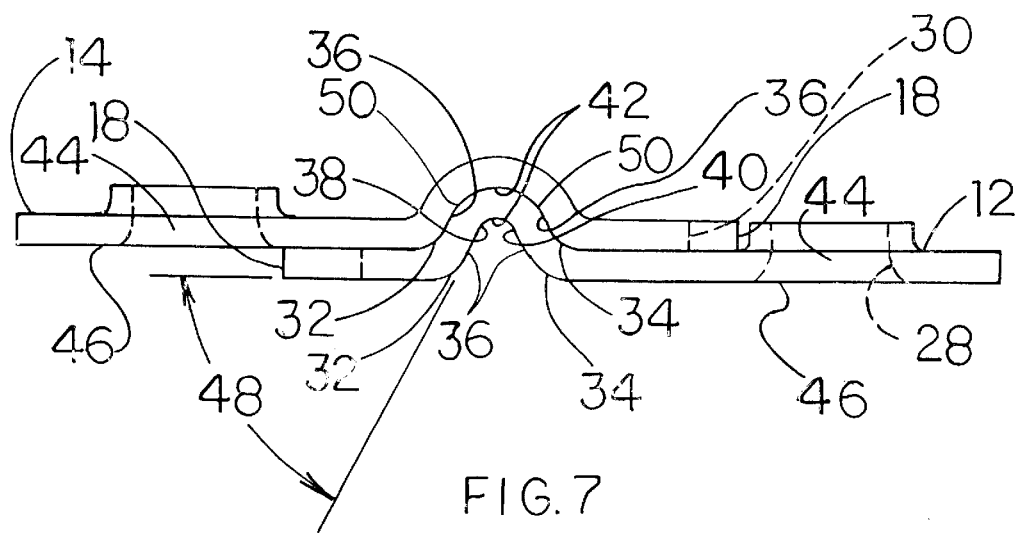
FIG. 7 is an enlarged side view of the new and improved fusible link of the invention.

Bent portion 24 in both of the pieces 12, 14 is positioned between opening 28 and end portion 18 and extends laterally across pieces 12, 14. In an end view and a side view as shown in FIGS. 2 and 7, bent portion 24 comprises bend 32 and spaced apart bend 34, oppositely facing flat or planar portions 36 and spaced top bends 38, 40, and a top flat or planar portion 42. Flat and planar portions 36 define an angle 48 with the planar top 44 and bottom 46 surfaces of the link pieces 12, 14. Flat planar portion 42 is generally parallel to top 44 and bottom 46 surfaces. In a specified embodiment bends 32, 34 have a radius of about 1/16 to about 1/4 inch. Angle 48 is between about 15 and 60 degrees. Bends 38 and 40 have a radius of from about 1/16 to about 1/4 inch. In bottom piece 12 flat planar portion 42 has a length measured longitudinally of piece 12 which is less than flat planar portion 42 of top piece 14.

In a specific embodiment, the longitudinal length of flat planar portion 42 of piece 12 is approximately 0.205 inches, the longitudinal length of flat portion 42 of piece 14 is about 0.297 inches. The different longitudinal length of planar portion 42 is measured longitudinally between opposite ends 16, 18 of pieces 12, 14 allows for the bend in piece 12 to fit within the bend 24 of piece 14 as shown in FIGS. 2 and 7 with flat planar portion 42 and flat planar portions 36 of pieces 12, 14 being superimposed on each other. Similarly, planar portion 44 adjacent bend 24 of piece 12 is superimposed upon bottom surface 46 of piece 14 adjacent bend 24 as shown in FIGS. 2 and 7.

Holding pieces 12, 14 together as shown in FIGS. 2 and 7 is a minute amount of eutectic solder positioned between pieces 12 and 14 generally and more specifically between superimposed surfaces 44, 46, 36 and 42 of the pieces 12, 14. An effective amount of eutectic solder is that amount necessary to wet entire surfaces 44, 46, 36, 42 of pieces 12, 14 uniformly. Typically that amount of solder coats surfaces 44, 46, 36, 42 with solder in a thickness from about 0.002 inches to about 0.004 inches.

In operation, the fusible end pieces 12,14 are formed of sheet stock by punching and drilling or otherwise forming opening 28 in end 16 and by forming bent portion 24 in both pieces 12, 14 in a press utilizing. Pieces 12, 14 can be of any material desired of the group listed above in Table I.

Pieces 12, 14 are assembled as shown in FIGS. 2 and 7 with appropriate eutectic material 50 therebetween. Eutectic material 50 is positioned on surfaces 44, 46 of pieces 12, 14 respectively which are superimposed upon each other such that the eutectic material 50 liberally coats all of the superimposed portions of those surfaces and all edges to protect from corrosion. Eutectic solder 50 must be chosen with regard to the temperature at which the link is desirably going to be used and is desirably broken. The above mentioned eutectic materials have eutectic temperatures ranging from about 100° F. to about 600° F.

At ambient temperatures, the fusible link can be utilized in apparatus to bear tensile forces applied between pins placed in openings 28 of pieces 12, 14 of appreciable amounts without the fusible link separating with little or no creeping being experienced.

Typically, the tensile and compressive forces are 5 times greater than the maximum operating load borne by the link. The increased tensile and compressive forces borne by the link are attributed to both the fact that the eutectic solder is strongest in shear rather than in tension and the frictional forces required to be overcome in sliding pieces 12,14 relative to each other when properly assembled as shown in FIGS. 2 and 7. This strength is accredited to both the eutectic solder 50 in shear and the special geometry including the surfaces 44, 46 of pieces 12, 14 must slide on themselves and the respective superimposed surfaces 36, 42 of the pieces 12, 14 in order to separate pieces 12, 14 as a result of the application of either tensile or compressive forces applied longitudinally of pieces 12, 14. Thus, the strength of the link is not totally dependent upon the strength of the eutectic solder, but is a combination of the strength of the eutectic solder in shear and the opposed frictional sliding forces between the superimposed portions of pieces 12, 14.

In the new and improved fusible link of the invention, the superimposed surfaces 44, 46 of pieces 12, 14 respectively, are maximized in superimposed surface areas in the superimposed area and special geometry to maximize the strength of the link. Cut-outs 30 are provided to allow the bolt pins, rivets or the like which are positioned in opening 28 of end 16 of pieces 12, 14 to have a washer lay flat on surfaces 44, 46 if desired. The invention provides a new and improved fusible link which may bear a load strength beneath the eutectic temperature in tension or compression without creep, a fusible link which breaks cleanly at the eutectic temperature and is able to carry loads that would be impossible without the invention, and a fusible link which utilizes the physical properties of the eutectic solder and metal stampings most desirably.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A fusible link comprising two pieces of sheet material, each piece having opposite ends and opposite side edges, one of said ends defining the opposite ends of said link, the other of said ends having generally planar surfaces between said side edges, said planar surfaces being superimposed adjacent the other of said ends, said superimposed surfaces being devoid of material weakening apertures, an effective amount of eutectic solder, said solder being solely positioned between said superimposed surfaces, said pieces being bent at said superimposed surfaces to define a bend extending transversely across said pieces from one of said side edges to the other of said side edges to provide additional strength to said link when said shear forces are applied to said solder and to reduce creep at temperatures below the eutectic temperature of said solder, and means including said bend for quickly separating said pieces when said eutectic solder reaches its eutectic temperature, said link being nestable with other links superimposed thereon for shipping.

2. The fusible link of claim 1, wherein said sheet material is chosen from the group of sheet materials consisting of copper, steel, brass, sheet materials, and composite sheet materials thereof.

3. The fusible link of claim 1, wherein said one ends are rounded and have a hole therein for connecting said link to other apparatus.

4. The fusible link of claim 3, wherein said holes are surrounded by planar surfaces upon which washers can be placed.

5. The fusible link of claim 1, wherein said superimposed surfaces are maximized in surface area.

6. The fusible link of claim 5, wherein said solder is provided between said superimposed surfaces in a thickness from about 0.002 to about 0.004 inches.

7. The fusible link of claim 1, wherein said bent superimposed surfaces define a bend which extends transversally across said link generally perpendicularly to the longitudinal length of said link.

8. The fusible link of claim 7, wherein said bend is crimped in each of said pieces.

9. The fusible link of claim 7, wherein said bend is formed in each of said pieces in a press.

10. The fusible link of claim 1 wherein said bent superimposed surfaces define a bend which extends generally transversally across said link, said bend being defined by opposite and spaced apart bottom planar surfaces which extend from opposite and spaced apart bottom bends at said superimposed surfaces and top elevated spaced apart bends, a top generally planar surface extends between said top spaced apart elevated bends, said planar surfaces having different longitudinally dimensions, said piece with the shortest longitudinal dimensions being positioned within said bend of said piece with the largest longitudinal dimensions.

11. The fusible link of claim 10, wherein said bottom planar surfaces define an angle with said sheet material of said links.

12. The fusible link of claim 11, wherein said angle is from about 15° to about 45°.

13. The fusible link of claim 11, wherein said angle is about 30°.

14. The fusible link of claim 10 wherein said top and bottom bends are radiused.

15. The fusible link of claim 14 wherein said bottom bends are radiused from about one quarter to about one sixteenth inches.

16. The fusible link of claim 14 wherein said top bends are radiused from about one quarter to about one sixteenth inches.

17. The fusible link of claim 14 wherein said top planar surfaces of said pieces with the shortest and longest longitudinal dimensions both have a longitudinal dimension from about 0.2 to about 0.3 inches.

18. The fusible link of claim 14 wherein said top planar surface of said piece with the shortest longitudinal dimension has a top planar surface with a longitudinal dimension of about 0.2 inches.

19. The fusible link of claim 17 wherein said top planar surface of said piece with the largest longitudinal dimension has a top planar surface with a longitudinal dimension of about 0.3 inches.

* * * * *